United States Patent
Yada et al.

[11] Patent Number: 6,077,615
[45] Date of Patent: Jun. 20, 2000

[54] GAS TURBINE NOZZLE, POWER GENERATION GAS TURBINE, CO-BASE ALLOY AND WELDING MATERIAL

[75] Inventors: Masami Yada; Takao Funamoto, both of Hitachi; Takamitsu Nakazaki, Takahagi; Kei Kobayashi, Kitaibaraki; Norio Yokoba; Nobuyuki Iizuka, both of Hitachi; Kazuhiko Kumata, Hitachinaka, all of Japan

[73] Assignee: Hitachi, Ltd., Tokyo, Japan

[21] Appl. No.: 08/991,610

[22] Filed: Dec. 16, 1997

[30] Foreign Application Priority Data

Oct. 20, 1997 [JP] Japan ................... 9-286518

[51] Int. Cl.⁷ ................... B32B 15/00
[52] U.S. Cl. ................... 428/544; 60/39.75; 148/408; 148/425; 148/442; 415/191; 415/200; 420/436; 420/437; 420/438; 420/439; 420/440; 420/588; 428/576; 428/636; 428/637; 428/668
[58] Field of Search ................... 428/544, 576, 428/636, 637, 668; 420/436, 437, 438, 439, 440, 588; 148/408, 425, 442; 60/39.75; 415/191, 200

[56] References Cited

U.S. PATENT DOCUMENTS

| | | | |
|---|---|---|---|
| 3,418,111 | 12/1968 | Herchenroeder | 420/436 |
| 3,909,157 | 9/1975 | Wachtell et al. | 415/208.3 |
| 5,066,459 | 11/1991 | Beltran et al. | 420/436 |

FOREIGN PATENT DOCUMENTS

| | | |
|---|---|---|
| 61-546 | 1/1986 | Japan . |
| 4-221035 | 8/1992 | Japan . |
| 7-224337 | 8/1995 | Japan . |
| 7-300643 | 11/1995 | Japan . |
| WO97/10368 | 3/1997 | WIPO . |

*Primary Examiner*—Deborah Jones
*Assistant Examiner*—Robert R. Koehler
*Attorney, Agent, or Firm*—Beall Law Offices

[57] ABSTRACT

A Co-base alloy including, by weight, 0.03–0.10% C, not more than 1.0% Si, not more than 1.0% Mn, 20–30% Cr, 15–23% Ni, 3–10% W, 5–10% Ta and 0.05–0.7% Zr, is used as a welding material. A gas turbine nozzle has a crack repaired with a multi-layer weld using the Co-base alloy and a gas turbine for power generation employs the nozzle.

18 Claims, 6 Drawing Sheets

COMBUSTION GAS FLOW

COOLING AIR

CONVECTION COOLING

IMPINGEMENT COOLING

| | TYPE A (THROUGH DEFECT) | TYPE B (UNTHROUGH DEFECT) |
|---|---|---|
| SECTION |  CRACK |  CRACK |
| DEFECT-REMOVING |  |  |
| REPAIR-WELDING |  |  |

GAS TURBINE NOZZLE, POWER GENERATION GAS TURBINE, CO-BASE ALLOY AND WELDING MATERIAL

BACKGROUND OF THE INVENTION

The present invention relates to gas turbine nozzles repaired by welding, a gas turbine using the nozzles, a Co-base alloy suited as welding material for repairing the nozzles, and welding material.

A gas turbine nozzle (stationary blade) has a complicated shape. Therefore, the nozzle is manufactured by precision casting. However, since a nozzle with a defect or defects occurred during the precision casting is exposed to a high temperature combustion gas flow and subjected to large constraint force due to its construction, a crack or cracks occur in some cases while the gas turbine is working. Such a defect or defects occurred during the precision casting or a crack or cracks occurred during working of the gas turbine is repaired by tungsten inert gas arc welding, using a welding material (metal added to a welding portion during welding) by which a metal weld of an expected composition is formed after the welding for repairing. The repaired portion by welding is desirable to have the same high temperature characteristics as the nozzle.

As an alloy for gas turbine nozzles, an alloy, comprising, by weight, 0.20–0.30% C, 0.75–1.0% Si, 0.4–1.0% Mn, 24.5–30.5% Cr, 9.5–11.5% Ni, 6.5–8.0% W, not more than 2% Fe, 0.005–0.015% B, and balance Co (an alloy of Table 1, No.8) is used in many cases. Further, in order to improve various high temperature characteristics, various alloy compositions are invented. For example, JP A 61-546 discloses high strength Co-base heat resistant alloys, one of which comprises, by weight, 0.01–1% C, 15–40% Cr, 0.01–2% Si, 0.01–2% Mn, 5–15% Ni, 2–12% of at least one of Mo and W, 0.01–3% Al, 0.05–5% Hf and and balance Co, and another comprises further, in addition to the composition, 0.01–5% Ta and 0.005–0.1% Zr. Those alloys are for improving high temperature strength and oxidation resistance at the same time. JP A 7-300643 discloses a heat resistant Co-base casting alloy which comprises, by weight, more than 0.45% and not more than 0.8% C, 15–30% Cr, 5–15% Ni, 3–10% W, 1–5% Re, 0.01–1% Ti, 0.01–1% Nb, 0.01–1% Zr, not more than 1% Si, not more than 1% Mn, not more than 1.5% Fe, further at least one kind of element selected from 1–5% Ta, 0.5–5% Hf, not more than 0.1% B and 0.05–0.5% Al when desired, and balance Co and inevitable impurities, and gas turbine stationary blades (nozzles) for which the alloy is used. Further, similarly, JP A 7-224337 discloses a heat resistant Co-base casting alloy which comprises, by weight, 0.05–0.45% C, 15–30% Cr, 5–15% Ni, 3–10% W, 1–5% Ta, 0.01–1% Zr and balance Co, and gas turbine stationary blades (nozzles) for which the alloy is used. However, in a case where an alloy of the same composition as that of those nozzles is used as a welding material, drawing it into a ire is impossible because the alloy has such composition that forging is almost impossible. Therefore, as a conventional welding material, a welding material of composition with which a forging property weighs was used even though such a property that has the same high temperature characteristics as the nozzle body is a little sacrificed. For example, a Co-base alloy for forging (C:0.10, Cr:20, Ni:10, W:15, and balance Co (Table 1 alloy No. 6) is used as a filler (welding) material, or the filler material is used which is the above-mentioned nozzle alloy in which the carbon content is reduced from 0.23% to 0.13% to make easy forging, and which comprises, by weight, 0.13% C, 29.82% Cr, 10.22% Ni, 6.77% W and balance Co (Table 1 alloy No. 7). Further, WO 97/10368 discloses an alloy which comprises, by weight, 0.11–0.20% C, 20–30% Cr, 15–22% Ni, 5–15% Ta, 0.05–0.7% Zr and balance Co (Table 1, alloy No. 5), and further JP A 4-221035 discloses an alloy which discloses, by weight, 0.03–0.10% C, 24–32% Cr, 14–22% Ni, 2–8% Ta, 0.02–0.75% Ce and balance Co.

In recent years, in order to improve the power generation efficiency, an inlet temperature of a gas turbine is raised, so that a combustion temperature becomes higher and the nozzles are exposed to more severe temperature conditions than before. In combined cycle power generation, the nozzles receive severe stress hysterisis that thermal stresses due to repetition of starting and topping and steady stresses during operation are superimposed. Therefore, welding material also is required to have higher creep strength and more excellent thermal fatigue characteristics than before. However, particularly, although welding material for repairing nozzles is desirable to have a high temperature characteristic of the same level as the parent material, since the welding material is necessary to be such alloy composition that forging is possible, taking it into consideration to make a wire for a filler rod, and it should be excellent in weldability, the alloy No. 6, No. 7, etc. have been used as the filler material in many cases. However, the conventional welding rods have advantages and disadvantages. They are that brittle different phases occur in grain boundaries whereby thermal fatigue resistance is lowered, that precipitations aggregate and get coarsened whereby the creep strength is lowered, ever though it is excellent in creep strength and thermal impact characteristic, drawing into a wire is difficult, so that flaws remain on the surface of the filler rod, or that a cost increase is invited because of the difficulty of drawing it into a wire.

SUMMARY OF THE INVENTION

An object of the present invention is to provide a gas turbine nozzle highly reliably repaired by welding, a gas turbine using it, a Co-base alloy which is easy to be drawn into a wire and has a high creep rupture strength, and a welding material of the Co-base alloy.

(1) The present invention is characterized, in a nozzle for a gas turbine which is formed by vanes and side walls provided at both end of the vanes, in that the nozzle has at least a crack, repaired with a multi-layer weld formed by welding 3 passes, preferably, 3 to 4 passes in a welding width direction, preferably the multi-layer weld being formed higher by one layer than an upper surface of a portion surrounding a groove for welding, the multi-layer weld having an outer surface ground to the same height as that of a surface of an adjacent portion to the repaired portion, or/and in that the nozzle has at least a crack which is repaired with multi-layer weld in a case where the crack has a length equal to or larger than 10 mm, the multi-layer weld being formed in a length of 10 mm or more.

(2) The present invention is characterized, in a nozzle for gas turbine which is formed by vanes and side walls provided at both end of the vanes, and made of a Co-base casing alloy comprising, by weight, 0.20–0.30% C, not more than 1.0% Si, not more than 1.0% Mn, 20–32% Cr, 9–12% Ni, 5–10% W, not more than 5% Fe and 0.0005–0.015% B, and that the nozzle has at least a crack repaired with a multi-layer weld formed by welding, the multi-layer weld being made of a Co-base alloy comprising, by weight, 0.03–0.10% C, not more than 1.0% Si, not more than 1.0% Mn, 20–30% Cr, 15–23% Ni, 3–10% W, 5–15% Ta and 0.05–0.7% Zr.

(3) The present invention is characterized, in a nozzle for a gas turbine which is formed by at least two and, preferably two-five vanes and side walls provided at both ends of each of the vanes so as to integrate the vanes into a mono-block having the vanes arranged in series, and made of a Co-base casing alloy, in that the nozzle has at least a crack repaired with a multi-layer weld formed by welding, the multi-layer weld being made of a Co-base alloy in which Ni is more in weight % than the Co-base casing alloy of the nozzle, and C, Cr and W each are less in weight % than the Co-base casing alloy, and Ta is contained. For the welding material it is preferable that the contents of C , Cr and W are decreased by 0.10–0.20%, 3.0–5.0% and 1.0–2.5%, respectively, from that of the parent material, and the content of Ni is increased by 8.0–12.0% from that of the parent material.

(4) The present invention is characterized, in a nozzle for a gas turbine which is formed by vanes and side walls provided at both ends of each of said vanes, and made of a Co-base casting alloy, in that the nozzle has at least a crack repaired with a multi-layer weld formed by welding, the multi-layer weld being made of a Co-base alloy which has a C content of 0.10–0.40 times as much as the C content of the Co-base casting alloy of the nozzle.

(5) The present invention is characterized, in the nozzle for a gas turbine set forth in the above item (2), (3) or (4), in that the crack is repaired with a multi-layer weld with 3 passes or more in a welding width direction and the multi-layer weld having an outer surface ground to the same height as that of a surface of an adjacent portion to the repaired portion, or/and in that the crack is repaired with a multi-layer weld, the multi-layer weld being formed in a length of 10 mm or more.

(6) The present invention is characterized, in a nozzle for a gas turbine, as set forth in the above item (2), which is formed by at least two vanes and side walls provided at both ends of each of the vanes so as to integrate the vanes into a mono-block having the vanes arranged in series, and made of the Co-base casting alloy, in that the nozzle has at least a crack repaired with a multi-layer weld formed by welding, the multi-layer weld being made of a Co-base alloy in which Ni is more in weight % than the Co-base casting alloy of the nozzle, C, Cr and W each are less in weight % than the Co-base casting alloy, and Ta is contained, or/and in that the nozzle has at least a crack repaired with a multi-layer weld formed by welding, the multi-layer weld being made of a Co-base alloy which has a C content of 0.10–0.40 times as much as the C content of the Co-base casting alloy of the nozzle.

(7) The present invention is characterized, in the nozzle for gas turbine, as set forth in the above item (2), which is formed by vanes and side walls provided at both ends of each of the vanes, and made of the Co-base casting alloy, in that the nozzle has at least a crack repaired with a multi-layer weld formed by welding, the multi-layer weld being made of a Co-base alloy which has a C content of 0.10–0.40 times as much as the C content of the Co-base casting alloy of the nozzle, or/and in that the nozzle has at least a crack repaired with a multi-layer weld formed by welding, the multi-layer weld being made of a Co-base alloy in which the contents of C, Cr and W each are less in weight % than that of the Co-base casting alloy, and Ta is contained.

(8) The present invention is characterized, in the nozzle for a gas turbine, as set forth in the above item (6) or (7), in that the nozzle has at least a crack repaired with a multi-layer weld welded 3 passes or more in a welding width direction, the multi-layer weld having an outer surface ground to the same height as that of a surface of an adjacent portion to the repaired portion, or/and in that the crack is repaired with a multi-layer weld, the multi-layer weld being formed in a length of 10 mm or more.

(9) The present invention is characterized by a Co-base alloy, comprising, by weight, 0.03–0.10% C, not more than 1.0% Si, not more than 1.0% Mn, 20–30% Cr, 15–23% Ni, 3–10% W, 5–10% Ta and 0.05–0.7% Zr.

Further, the present invention resides in a Co base alloy comprising, by weight, at least one kind of element selected from not more than 1% Al and not more than 2% Fe, and/or comprising, by weight, at least one kind of element selected from 0.05–1.0% Ti, 0.05–0.5% Nb and 0.05–0.5% Hf, and/or comprising, by weight, 0.005–0.02% B.

(10) The present invention resides in a welding material, characterized by being made of one of these Co-base alloys, constructed in the form of a wire, rod or a compound wire from metal powder which is filled into a steel tube of small diameter.

(11) The present invention is characterized, in a gas turbine for power generation comprising an air compressor, a combustor, turbine blades fixed to a turbine disc and turbine nozzles provided, facing the turbine blades, in that an inlet temperature of combustion gas to a first stage of said turbine nozzle is 1,250° C. or more, preferably, 1,400–1,600° C., and the gas turbine nozzle has at least a crack repaired with a multi-layer weld filled in the interior of the crack.

A gas turbine for power generation, relating to the present invention, is characterized by comprising the nozzles for gas turbine as set forth in any one of the above items (1) to (8).

In the present invention, a weld of three passes or more is formed in a direction of the welding width, whereby a crack can be repaired to such a condition that almost no troubles occur by the repaired crack. The crack extends along one main crack with a small number of branches and the length of the branches is very small.

Therefore, it is necessary to cut away that branched portion by machining. The width of the cut-away portion is about 10 mm, and it can be repaired to the condition of almost no problem occurring by cutting away 10 mm or more in width along the main crack.

Further, in the present invention it is found by an experiment that no problem occurs in use after repairing by repairing it so that the length of an overlayed weld formed by the repairing becomes 10 mm or more.

A welding material for repairing has deep relevance with a base (parent) material. An alloy which has workability of wire-drawing and a high creep rupture strength can be obtained by decreasing the content of C, Cr and W as compared with the compositions of the base material and containing a specific content of Ta. Further, the weldability is improved and a high strength can be maintained by including C of a content of 0.1–0.4 times as much as the content of C in the base material.

It was found that in gas turbine nozzle according to the present invention, in particular, a crack is likely to occur at a very high temperature of a 1,500° C. class (1,400–1,600° C.) of an inlet temperature of exhaust gas at first stage nozzles, the length of the crack occurred at that time reaches 10 mm or more, and the crack of such length becomes a problem, and the gas turbine nozzles is characterized by effecting a prescribed repairing according to the present invention.

A feature of the composition of a CO-base alloy and its welding material is that the contents of Ni, Ta, and Zr are 15–22%, 5–10% and 0.05–0.7%, respectively, and those contents are more than the contents of conventional alloys. Thereby, as described later, an effect of improving the high temperature strength and thermal stress resistance can be obtained by densely depositing (Ni, Co)$_3$Ta of a composite intermetallic compound in the parent phase, and stabilizing the compound deposited in the grain boundaries even at a high temperature. In other words, in the present invention, it is necessary that more than a certain amount of the composite intermetallic compound (Ni, Co)$_3$Ta is deposited densely in the parent phase.

With the above construction, the characteristics that are desirable as welding metal are obtained, which characteristics are to have sufficient creep strength even at a high temperature and high high-temperature strength and thermal fatigue resistance, while maintaining such characteristics that sufficient workability exists even in a case where it is worked in a shape of a rod as a welding material, and cracking (called high temperature cracking) does not occur in a welding metal during welding.

In the above-mentioned composition, if Ta and Zr are in a range of Ta: 5.5–8% and Zr: 0.1–0.5%, it is preferable because the creep strength becomes stronger.

Operation of each element contained in the welding material and nozzle according to the present invention is explained hereafter.

Cr is an important element which forms a dense oxide film on an alloy surface at a high temperature and bears corrosion resistance of the alloy. Therefore, at least 20% Cr is added under a corrosive circumference in which high temperature parts of an industrial gas turbine are exposed. However, an addition of 30% or more for welding material and 32% or more for nozzle loses the stability of a parent phase. At the same time, Cr is combined with C to form a lot of Cr carbides, of which fine Cr carbides of about 0.5 $\mu$m or less in grain size serve to improve a high temperature strength. On the other hand, Cr carbides larger than 0.5 $\mu$m aggregate, coarsen and affect a bad influence on both of the strength and corrosion resistance. Therefore, the content of Cr is preferable to be in a range of 20–30% for a welding material and 20–32% for nozzle. In particular, 25–30% is preferable.

C forms carbides with Cr when C is 0.03% or more for welding material and 0.20% or more for a nozzle, and forms stable MC carbides with Ta, Zr, Nb, Ti, Hf, etc. Fine MC carbides among them improve remarkably the creep strength and high temperature strength. In general, as an amount of C added increases, the strength increases. However, in the alloy of the present invention, which has 5–15% of Ta added, as an additional amount of C increases, Ta-rich carbides are deposited excessively in grain boundaries to decrease the creep strength. Therefore, an upper limit of the content of C is preferable to be 0.1% for welding matrial and 0.30% for a nozzle, in particular, 0.04–0.095% for welding material is preferable and 0.08–0.09% for welding material and 0.20–0.27% for a nozzle is more preferable.

Ni, generally, is an element which is necessary to maintain the stability of a parent phase of an alloy. However, particularly, the alloy of the present invention is characterized by depositing densely, in the parent phase, a composite intermetallic compound (Ni, Co)$_3$Ta which improves the high temperature strength and thermal fatigue resistance. Therefore, Ni of at least 15% for welding matrial, 9% or more for a nozzle is added, and the effect can not be expected by adding 23% or more for welding material and 12% or more for nozzle, so that 15–23% for welding material is preferable, particularly 19–22% is preferable.

Ta is an element to form MC carbides when the content is 5% or more, however, in the alloy of the present invention, it is an important element which forms a composite intermetallic compound (Ni, Co)$_3$Ta and improves the high temperature strength and thermal fatigue resistance. However, since a the addition of more than 15% deposits excessively MC carbides in the grain boundary, the creep strength decreases. Moreover, a problem that cracking by welding occurs. Therefore, an upper limit of the content of Ta is preferable to be 15%. On the other hand, when the content of Ta is 5% or less, a deposition amount of a composite intermetallic compound of (Ni, Co)$_3$Ta is too small to expect the effect. In the alloy of the present invention, the content of Ta is preferable to be in a range of 5–15%, particularly, 5.5–10% is preferable.

W is disolved into the parent phase and improves the creep strength with 3% or more for welding material and 5% or more for a nozzle. However, the effect can not be attained when it is less than 3%, and when more than 10%, depositions combined with Ta are deposited in the grain boundary and the creep strength decreases. Therefore, an upper limit of the content of W is preferable to be 10%, particularly, 4–7% is preferable.

Zr of 0.05% or more is an important element as an element strengthening grain boundaries, particularly, in the alloy of the present invention, it makes more dense depositions of composite intermetallic compounds of (Ni, Co)$_3$Ta and serves to improve the creep strength and thermal fatigue characteristic, so that it is an essential element. Since the effect is small by an addition of less than 0.05%, 0.05% or more is preferable. Further since weldability decreases when an amount of addition is 0.70% or more, the upper limit is preferable to be 0.7%. Particularly, 0.1–0.5% is preferable.

Ti is an element forming carbides, and addition of Ti deposits fine carbides and improves a high temperature strength. It forms a similar (Ni, Co)$_3$Ti to the composite intermetallic compound of (Ni, Co)$_3$Ta mentioned above in part and serves to improve the high temperature strength. However, the effect can not be attained when the content is less than 0.05% and the effect is small even if 1% or more is added, so that 0.05–1% is preferable, particularly, 0.1–0.6% is preferable.

Nb combines with C when it is 0.05% or more and forms MC carbides, thereby improving the high temperature strength. However, an addition of more than 0.5% deposits the carbides in the grain boundaries and decreases the high temperature strength. Therefore, 0.05–0.5% is preferable, particularly, the effect is exhibited by a very small amount of addition of Nb together with Ti, Hf, etc.

Hf, when 0.05% or more, is known as an element forming carbides and strengthening grain boundaries at the same time. In the alloy of the present invention, however, more than the effect can not be expected by addition of 0.5% or more. Therefore, 0.05–0.5% is preferable.

B, when 0.0005% or more, is added as an element strengthening grain boundaries to improve the high temperature ductility. However, when it is more than 0.02%, embrittlement of the grain boundaries is caused and, additionally, the weldability also is affected. Therefore, 0.005–0.02% is preferable, particularly, 0.005–0.01% is preferable.

Al has an effect of forming dense oxide films on an alloy surface at a high temperature of 950° C. or more and improving the corrosion resistance. However, at a temperature of 950° C. or less, stable oxide films are not formed, and further, the corrosion resistance is worsened. Further, harmful inclusions are easy to be formed during its solidification, and an addition of more than 1% worsens the casting ability and weldability. Therefore, the addition is preferable to be 1% or less.

In a case where C and B are added, Fe alloys such as Fe—C, Fe—B become a dissolution raw material. By adding them as Fe alloys, a yield rate in dissolution of those light elements increases. Therefore, Fe is to be included in the alloy. An addition of 2% or more lowers the high temperature strength, so that it is preferable to adjust the amount of addition to be 2% or less.

Si and Mn have been added as deoxidizing agents, however, an improved vacuum melting technique makes it unnecessary to positively add them at present. In melting in atmosphere, addition of 0.05% or more is preferable. On the contrary, addition of more than 1% forms harmful inclusions during casting to lower the strength. In addition to that, use for a long time causes embrittleness of the material, so that it is preferable for each element to be 1% or less, particularly, 0.05–0.5% Si and 0.1–0.5% Mn for welding material, and 0.6–1.0% Si and 0.3–0.6% Mn for nozzle are preferable.

The above-mentioned Co-base casting alloys can be used for gas turbine nozzles according to the present invention. An Co-base casting alloy is more preferable, which comprises, by weight, 0.20–0.30% C, 0.3–1.0% Si, 0.2–1.0% Mn, 24.5–30.5% Cr, 9.5–11.5% Ni, 6.0–8.0% W, not more than 2% Fe and 0.002–0.015% B. Reasons of addition of each element are about the same as welding material. However, the content of C, etc. is different from the welding material from a viewpoint of strength.

A first stage nozzle is exposed to a highest temperature because of receiving first a combustion gas, and receives remarkable thermal stress and thermal impact by repetition of starting and stopping of the gas turbine. In a gas turbine in which a combustion gas temperature is 1,400–1600° C., a Co base casting alloy having a useful temperature of 900° C. or more at $10^5$ hours-6 kgf/mm$^2$ even if a cooling capacity is considered is used, and 2 series of vanes are preferable. Nozzles of the second stage or after are not so severe with respect to temperature as compared with the first stage nozzles. However, a metal temperature is higher than that of a conventional gas turbine in which a combustion temperature is a 1300° C. class, and a Ni-base casting alloy of a useful temperature of 800° C. at $10^5$ hours-14 kgf/mm$^2$ is preferable therefor.

Nozzle members are subjected to welding in some cases in order to repair casting defects caused during manufacturing time, and/or to repair crack or cracks caused by thermal stresses generated after assembling and use of internal cooling parts. A welding property of material for the nozzle members is judged by whether or not cracking occurs within the beads formed by TIG welding of one pass of a length of 80 mm and a width of 4 mm, and the material is preferable for welding to be done to cause no crack without preheating. Although preheating is preferable in order cause less cracking the temperature is referable to be 400° C. or less.

In the gas turbine for power generation for achieving the above-mentioned object, a gas inlet temperature of gas to the first stage turbine nozzles is 1400–16000C., preferably, 1450–15500C., a metal temperature of the first stage turbine blades is 920° C. or more, a gas turbine exhaust gas temperature is 590° C. or more and 650° C. or less, and a gas turbine power generation efficiency of 37% or more is attained. Here, the power generation efficiency is expressed by LHV (Low Heat Value). In the power generation gas turbine according to the present invention, the first stage blades are made of a Ni-base single crystal alloy or Ni-base columnar crystal alloy of a useful temperature of 920° C. or more at $10^5$ hours-14 kgf/mm$^2$, the turbine blades of the second stage or after are made of a Ni-base columnar crystal alloy or Ni-base equiaxed crystal alloy of a useful temperature of 800° C. or more at $10^5$ hours-14 kgf/mm$^2$.

For the first stage blades, a single crystal casting or one-way solidification casting of Ni-base alloy is used. Here, the single crystal casting is a casting in which the whole of a product does not substantially have crystal grain boundaries by solidifying in one way. The one-way solidification casting is a casting which has only grain boundaries substantially parallel to a solidification direction, formed by one-way solidification. Those alloys have a higher creep strength than an equiaxed grain structure casting formed by usual casting, particularly, the single crystal casting has the highest useful temperature. Even in a case where a one-way solidification casting is used, a similar effect to a case where a single crystal blade is used can be attained by jointly using heat-shielding coating.

For the first stage nozzle material, thermal fatigue resistance, corrosion resistance and weldability taking into consideration of repairing are required. However, in order to satisfy all those properties, it is the most suitable for the first stage nozzle to use a Co-base alloy provided with heat-shielding coating having a ceramics layer, and for the first stage blades to use a one-way solidification casing of a Ni-base alloy provided with heat-shielding coating having a ceramics layer or a single crystal casting of Ni-base alloy.

From the above, in a gas turbine for power generation, according to the present invention, which comprises a compressor, a combustor, turbine blades of three stages or more, fixed to turbine discs, and turbine nozzles of three stages or more provided so as to face the above-mentioned turbine blades, any one of the following materials and constructions is preferable:

(1) It is preferable that first stage turbine blades each are made of a single crystal casting or one-way solidification casting of Ni-base alloy, first stage turbine nozzles each are made of a casting of Co-base alloy provided with heat-shielding layer, and turbine blades and turbine nozzles of the second stage and stages thereafter each are made of a casting of Ni-base alloy.

(2) First stage turbine blades each are made of a one-way solidification casting of Ni-base alloy provided with a heat-shielding layer, first stage turbine nozzles each are made of a casting of Co-base alloy provided with a heat-shielding layer, and turbine blades and turbine nozzles of the second stage and stages thereafter each are made of a casting of Ni-base alloy.

It is most effective for improving the thermal efficiency of the gas turbine to raise a combustion gas temperature as mentioned above. Taking into consideration joint use of highly-graded cooling technique of blade and nozzle and heat shield coating technique, when as a useful or service metal temperature of the first stage turbine blades, a temperature of 920° C. or more is taken, as a gas inlet temperature of gas to the first stage nozzles, a temperature, particularly, of 1,450–1,550° C. can be taken. Thereby, the power generation efficiency of the gas turbine can be raised to 37% or more. The power generation efficiency in this case is expressed by LHV type. Further, by designing for a turbine exhaust gas temperature to be 590–650° C., total power generation efficiency in a case where a steam turbine with a steam temperature of 530° C. or more and a gas turbine with a gas turbine nozzle inlet temperature of 1400° C. or more are combined to form a composite power generation system, can be raised to 55% or more, and an excellent high efficiency power generation system 5 can be provided. It is preferable that the steam turbine has a single rotor chamber, and that it is a high and low pressure sides-integrated steam turbine having a high and low pressure sides integrated mono-block type rotor having blades arranged thereon, the blade portion length of which is 30 inches or more.

DESCRIPTION OF EMBODIMENTS OF THE INVENTION

Embodiment 1

Table 1 shows chemical compositions (weight %) of used alloys according to the present invention and comparative alloys. In the chemical compositions, remaining or balance of each alloy is Co. Alloy Nos. 1 to 4 are alloys for filler rods (welding rods) according to the present invention and alloy Nos. 5 to 7 are alloys for comparative filler rods. In the filler rods according to the present invention, oxygen content is 0.003% or less and nitrogen content is 0.003–0.015%. It is newly found that the comparative alloy No.5 has such a problem that drawing for forming a wire is difficult, and flaws and foreign matters are included. No. 6 and No. 7 are alloys for filler rod, which are on sale. Further, No. 8 is Co-base casting alloy for gas turbine nozzles, and used as parent material for overlaying (welding). The filler rods from No. 1 to No. 5 were formed by hot-forging an ingot of weight 100 N melted by high frequency melting, then processing prescribed working processes of hot-swaging and wire drawing. In the process of swaging, it was heated to 1,150–1,200° C in an electric furnace, then reduced to a diameter of 16 mm. The swaging, in which a reduction rate by once working is 20%, was repeated to be a diameter of 16 mm. After the swaging process, it was drawn in hot working to be a diameter of 1.7–1.8 mm and finally a filler rod of a target diameter of 1.6 mm and length of 1,000 mm was made. Further, in the wire drawing also, a reduction rate by once working was set to be 20%, annealing was effected each working as well as the swaging, and the working was repeatedly effected. The alloy of No.5 was not preferable because flaws and foreign matters were included in the surface in the wire drawing process.

A production method of welding test pieces used for weldability and high temperature characteristics of welding metal are described hereunder.

TABLE 1

| Alloy No. | C | Si | Mn | P | S | Cr | Ni | W |
|---|---|---|---|---|---|---|---|---|
| 1 | 0.039 | 0.09 | 0.41 | 0.001 | 0.001 | 24.45 | 20.89 | 4.88 |
| 2 | 0.040 | 0.32 | 0.24 | 0.001 | 0.003 | 25.20 | 20.60 | 5.37 |
| 3 | 0.060 | 0.03 | 0.41 | 0.001 | 0.001 | 26.13 | 21.53 | 5.02 |
| 4 | 0.091 | 0.24 | 0.24 | 0.005 | 0.003 | 25.32 | 20.37 | 5.51 |
| 5 | 0.124 | 0.24 | 0.21 | 0.003 | 0.003 | 25.60 | 20.40 | 5.53 |
| 6 | 0.08 | 0.18 | 1.38 | 0.005 | 0.009 | 20.15 | 9.99 | 14.87 |
| 7 | 0.13 | 0.75 | 0.86 | 0.004 | 0.006 | 29.82 | 10.22 | 6.77 |
| 8 | 0.23 | 0.83 | 0.43 | 0.004 | 0.006 | 29.20 | 9.92 | 6.97 |

| Al | Zr | Ta | Fe | C/C(parent material) | Remarks |
|---|---|---|---|---|---|
| — | 0.17 | 6.98 | — | 0.17 | Invention alloy |
| 0.020 | 0.21 | 6.96 | 0.28 | 0.17 | " |
| — | 0.17 | 7.01 | — | 0.26 | " |
| 0.017 | 0.33 | 6.74 | 0.07 | 0.40 | " |
| 0.013 | 0.25 | 6.92 | 0.08 | 0.54 | Comparative alloy |
| — | — | — | 2.52 | 0.35 | " |
| 0.030 | — | — | 0.12 | 0.57 | " |
| — | — | — | 0.12 | — | Parent material (nozzle material) |

Figure 1:
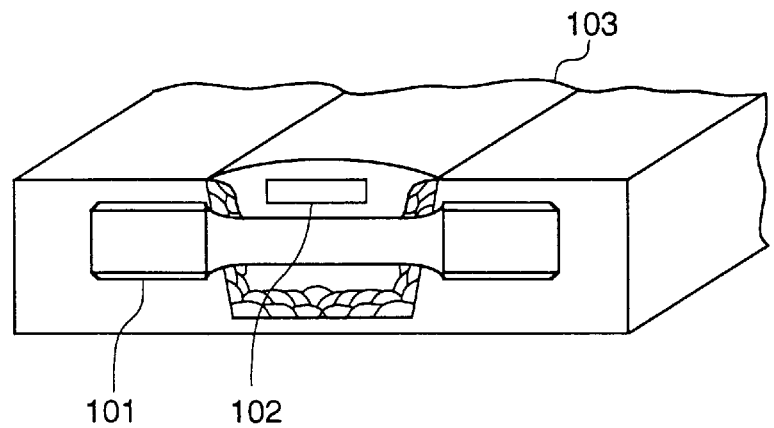
FIG. 1 is a perspective view showing a taking out position of test pieces of a welding portion for high temperature strength and corrosion test.
Figure 2:
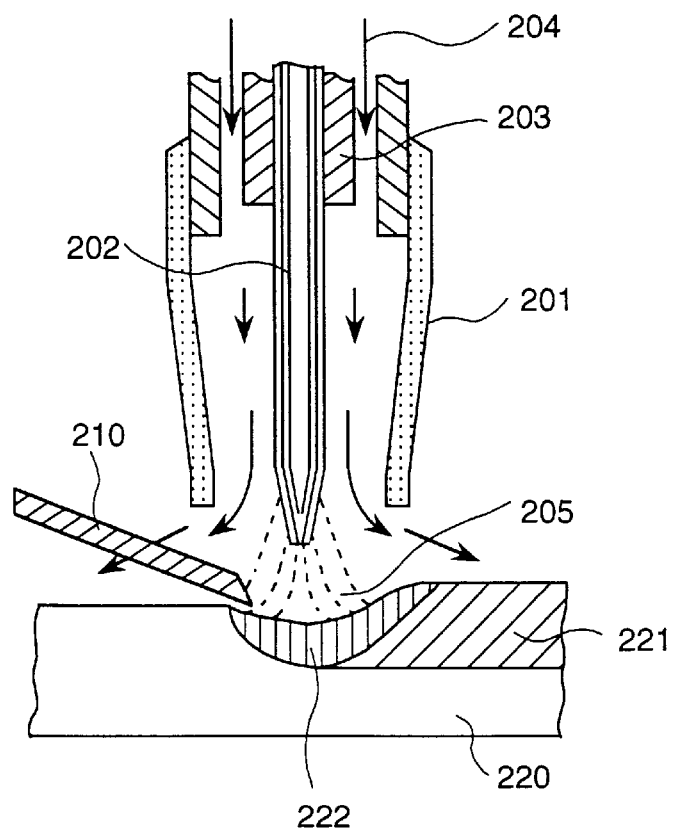
FIG. 2 is a sectional view of a TIG welding apparatus.
Figure 3:
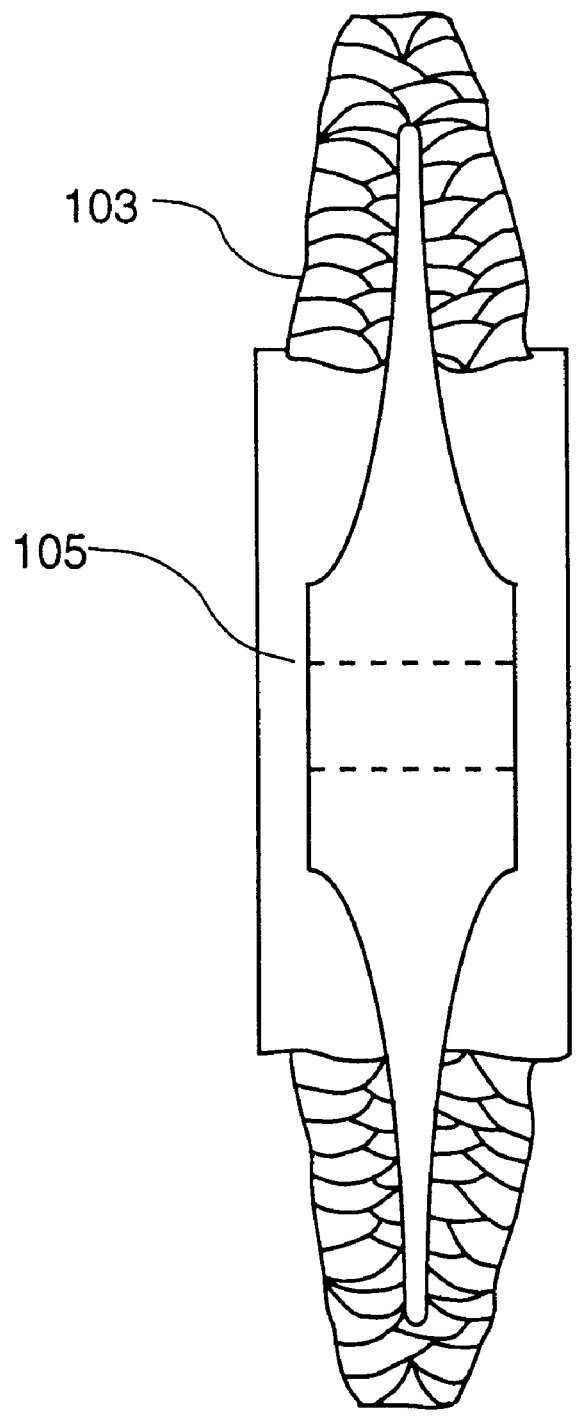
FIG. 3 is a perspective view showing a taking out position of a test piece for thermal impact test.

FIG. 1 shows a view, showing a groove shape and a gist of taking out a high temperature strength test piece 101 (tensile, creep and low cycle fatigue test) and a corrosion test piece 102. 103 is a multi-layer weld which is a weld formed by overlaying in multi-layers. Under the welding conditions of welding current of 80 A, welding speed of 8–10 cm/min and an interpass (interlayer) temperature ≦100° C., TID welding was effected by a welding apparatus shown in FIG. 2 in which 201 is a gas nozzle, 202 is a tungsten electrode, 203 is a collet, 204 is an inert gas and 205 is arc. Further, 210 is a filler rod, 220 is a parent material, 221 is weld metal and 222 is a molten bath. Weldability of a welded portion was judged by a dyeing flaw detecting test and section structure inspection. FIG. 3 shows an overlayed weld 103 and a gist of taking out of a thermal impact test piece 105. TIG welding was performed while rotating a test piece to be overlayed by welding (peripheral speed: 8 cm/min). The welding current was set at 80 A and the interpass (interlayer) temperature was set ≦100° C. Those welding test pieces as shown in FIGS. 1 and 3 were subjected to solid solution treatment of heating to and keeping at 1,150° C. for 4 hours and an ageing treatment of keeping them at 982° C. for 4 hours, and then prescribed evaluation test pieces were made. The weldability and the test results of high temperature properties are shown in Table 2.

TABLE 2

| | Weldability | | | 816° C. tensile test | | | |
|---|---|---|---|---|---|---|---|
| Alloy No | Surface inspection result | Section inspection result | Hardness Hv(98N) as it is welded | 0.2%-yield stre. (Mpa) | Tensile strength (Mpa) | Elongation (%) | Drawing (%) |
| 1 | Good | Good | 281 | — | — | — | — |
| 2 | Good | Good | 276 | 254 | 431 | 28 | 32 |

TABLE 2-continued

| | | | | | | | |
|---|---|---|---|---|---|---|---|
| 3 | Good | Good | 277 | — | — | — | — |
| 4 | Good | Good | 297 | 256 | 446 | 37 | 54 |
| 5 | Good | Defect occur (lack of penetration) | 310 | — | — | — | — |
| 6 | Good | Good | 300 | 165 | 410 | 36 | 33 |
| 7 | Good | Good | 300 | 231 | 459 | 25 | 36 |

| 816° C. creep rupture test | | 900° C. low cycle fatigue test | | 200° C. ⇆ 900° C. thermal impact test | 816° C. × 25 h molten salt corrosion test |
|---|---|---|---|---|---|
| Stress (MPa) | Rupture time (h) | Total strain (%) | Repetition number till rupture (times) | Maximum crack length at repeating number 300 times (mm) | Weight reduced by corrosion (mg/cm²) |
| — | — | — | — | — | — |
| 172 | 750 | 0.4 | 1600 | 5 | 29 |
| — | — | — | — | — | — |
| 172 | 1056 | 0.4 | 1800 | 3 | 23 |
| — | — | — | — | — | — |
| 172 | 44 | 0.4 | 1080 | ≧10 | 50 |
| 172 | 22 | 0.4 | 1720 | ≧10 | 19 |

(1) Weldability

Weldability was judged by inspection of whether or not there was occurrence of crack through a dyeing flaw inspection test of a surface of a welded portion and observation of a section of the welded portion. Such defects as welding cracks on the weld surface and the weld section by the filler rods of the present invention were not found, and it was confirmed that the weldability was good as well as the weldability by the conventional filler rods. A filler rod of the comparative alloy No. 5 was not good because penetration was insufficient due to surface flaws and inclusion of impurities. In this alloy, only the content of C is more than that of the alloys of the present invention by 0.10% by weight. Hardness of the welded portion as it was welded in each of the alloys of the present invention was vickers hardness Hv 300 or less, while the comparative alloy is Hv 310, which was the highest. It was found that the content of C for easy wire drawing should be 0.10% or less.

(2) High Temperature Tensile Properties

High temperature tensile properties were evaluated at 816° C. Tensile properties of weld metal by the filler rods of the present invention are almost not less than those of conventional alloys.

(3) Creep Rupture Property

Creep rupture property was evaluated at 900° C. under a constant loaded stress of 172 MPa. Rupture time of weld metal by filler rods of the present invention was more than 20 times as long as the rupture time of weld metal by the conventional filler rods, the alloy NO.1 was 750 hours, the alloy No. 4 was 1,056 hours, and they were very excellent.

(4) Low Cycle Fatigue Property

Low cycle fatigue property was evaluated at 900 ° C., in total strain range constant of 0.4%. The low cycle fatigue property was almost not less than the conventional property.

(5) Thermal Impact Property

Thermal impact property was evaluated by the maximum crack length which occurred when thermal cycles of 300 times were repeated between 200° C. and 900° C. This repetition of thermal cycles of 300 times corresponds to one year DSS operation of a gas turbine (it is an operation of starting and stopping, performed everyday for one year). Crack length of weld metal by the filler rod of the present invention is half or less of the crack length of weld metal by the conventional filler rod, the crack length by the alloy No. 1 is 5 mm and the crack length by the alloy NO. 5 is 3 mm, thus they are small. It was confirmed that they were excellent in thermal impact resistance.

(6) Corrosion Property

Corrosion property was examined by a molten salt painting heating method. Molten salt is a mixed salt of $Na_2SO_4$—25% NaCl. The mixed salt $Na_2SO_4$—25% NaCl was painted on a test piece, using a binder of methanol, the corrosion property thereof was evaluated from a reduced amount after heating it for 25 hours. The mixed salt was painted only on one side of the test piece at a target painting amount of about 0.2 kg/m . The test piece was 13 mm in diameter and about 3 mm in thickness. As a result, the corrosion property of the weld metal by the filler rod of the present invention was almost not inferior to the property by the conventional filler rod.

As is apparent from the present embodiment, it was confirmed that the weldability, high temperature strength and corrosion resistance of the weld metal, by the filler rods of the present invention each were excellent to the extent equal to or more than the properties by the conventional filler rods. Particularly, the creep property and thermal impact property which are aims of the present invention can be attained by using the filler rods of the present invention. Further, from comparison of the results of creep property and thermal impact property, it was confirmed that there was a strong co-relationship between the thermal fatigue strength and creep strength.

Embodiment 2

Figure 4:
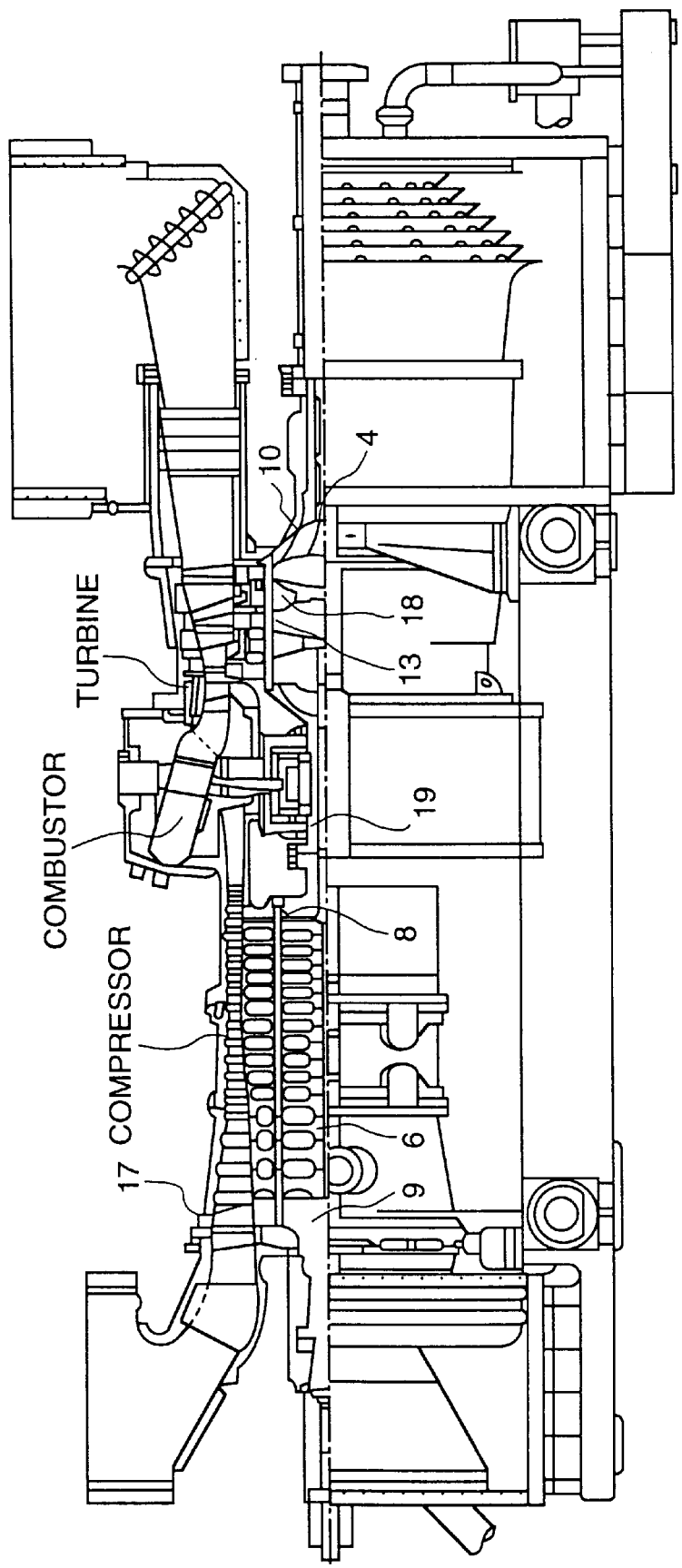
FIG. 4 is a sectional view of a rotational portion of a gas turbine according to the present invention.
Figure 5:
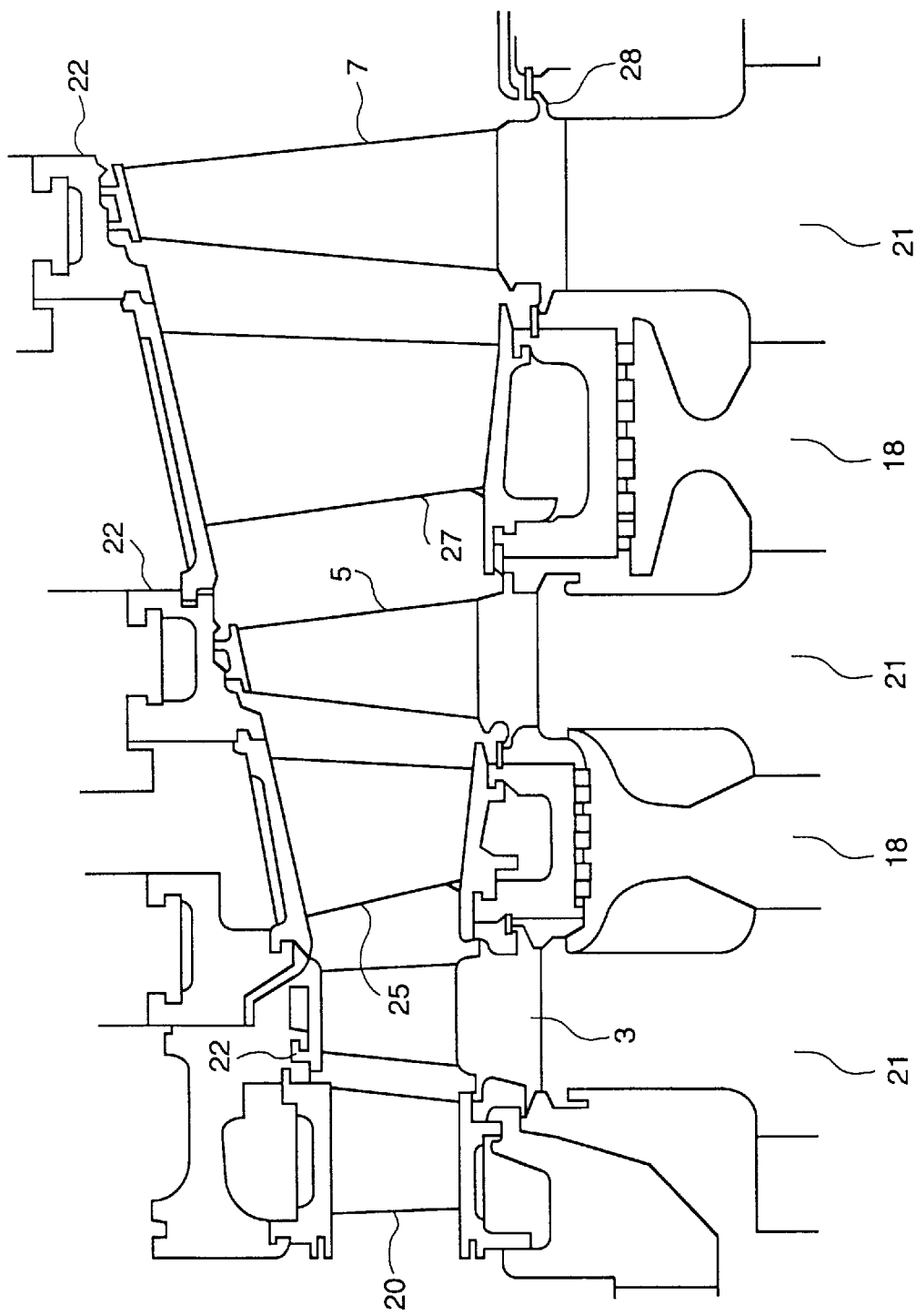
FIG. 5 is an enlarged view of turbine blade and nozzle portions of the gas turbine in FIG. 4.

FIG. 4 is a sectional view of a rotating portion of a power generation gas turbine according to the present invention. FIG. 5 is an enlarged view of blade and nozzle portions. In the Figures 3 denotes first stage blade; 5, second stage blade; 7, third stage blade; 20, first stage nozzle; 25, second stage nozzle; 27, third stage nozzle; 4, turbine disc; 10, turbine stub shaft; 13, turbine stacking bolt; 18, turbine spacer; 19, distant piece; 6, compressor disk; 17, compressor blade; 8, compressor stacking bolt; and 9, compressor stub shaft. The gas turbine according to the present invention has three stages of turbine blades and three stages of turbine nozzles.

The first blades 3 of the gas turbine in the present embodiment each are a single crystal casting of Ni-base super alloy which comprises, by weight, 6–9% Cr, 0.5–5% Mo, 0.5–10% W, 4–7% Al and 0.5–10% Co, or a Ni-base alloy including, in addition to the above Ni-base superalloy, at least one kind of element selected from 1–4% Re, 3–9% Ta, not more than 0.2% Hf, not more than 2% Ti, not more than 2% Nb and not more than 5% Mo. The first stage blade has a blade portion length of 130 mm or more and a total length of about 220 mm or more. A useful temperature of this single crystal casting at $10^5$ hours 14 kgf/mm$^2$ is 930–940° C., the first stage blade has complicate air cooling holes formed in the interior and it is cooled with compressed air during operation. The cooling system is a closed cooling system, and the cooling structure is of staggered ribs type. On the surface of the blade, a layer of an alloy, which comprises, by weight, 2–5% Al, 20–30% Cr, 0.1–1% Y and remaining Ni or Ni+Co, is coated to be 50–150 μm thick by plasma spraying under a non-oxidized reduced-pressure atmosphere, whereby corrosion resistance is improved. This single crystal casting is subjected to a solution treatment at 1,250–1,350 ° C., and then to 2-step ageing at 1,000–1,100° C. and at 850–950° C., whereby γ' phases in each of which the length of one side is 1 μm or less are deposited 50–70 by volume %.

The second stage blade 5 and third stage blade 7 each are made of a Ni-base superalloy which comprises, by weight, 12–16% Cr, 0.5–2% Mo, 2–5% W, 2.5–5% Al, 3–5% Ti, 1.5–3% Ta, 8–10% Co, 0.05–0.15% C, 0.005–0.02% B and remaining of inevitable impurities and Ni. Those blades each have equiaxed grain structure which is attained by usual casting. The second stage blade has internal cooling holes and it is cooled with compressed air. On the blade surface, diffusion coating of Cr or Al is performed, whereby the corrosion resistance is improved. Those Ni-base alloys are subjected to heat treatment similar to the above-mentioned treatment.

The first stage nozzle 20 has vanes arranged in 2 series, and is made of a Co-base superalloy which comprises, by weight, 20–32% Cr, 9–12% Ni, 5–10% W, 8–10% Co, 0.2–0.4% C, not more than 1% Si, not more than 1% Mn, 0.005–0.015% B and not more than 5.0% Fe, or a usual casting material (equiaxed grain structure) of a Co-base superalloy which can comprise, in addition to the above alloy composition, at least one kind of element selected from 0.1–0.4% Ti, not more than 1% Zr, not more than 0.3% Nb and not more than 1.0% Hf and not more than 2.0% Ta, and remaining inevitable impurities and Co. A useful temperature of this alloy at $10^5$ hours 6 kgf/mm$^2$ is 900–910° C. Cooling is closed type impingement cooling. A heat shielding layer is provided on a portion, of an outer surface of the first nozzle, in contact with flames. The layer is made of fine columnar crystals, and includes a base metal, zirconia layer and joining layer therebetween, formed by vapor deposition of a $Y_2O_3$-stabilized zirconia layer of fine columnar structure of double-structure having fine columnar crystals of diameter 10 μm or less in macro-columnar crystals of diameter 50–200 μm to 100–200 μm thick. The joining layer is a thermal sprayed layer of an alloy comprising, by weight, 2–5% Al, 20–30% Cr, 0.1–1% Y and remaining of Ni or Ni+Co. The alloy layer has an effect of improving corrosion resistance as well as a heat shielding effect. This casting material is subjected to solution treatment at 1,150–1,200° C. and then to a one-step ageing treatment at 820–880° C.

The second stage nozzle 25 and the third stage nozzle 27 each have vanes arranged in 3 series, and each of them is made of a Ni-base casting alloy which comprises, by weight 21–24% Cr, 18–23% Co, 0.05–0.20% C, 1–8% W, 1–2% Al, 2–3% Ti, 0.5–1.5% Ta, 0.05–0.15% B and remaining of inevitable impurities and Ni. Those nozzles each have equiaxed grain structure attained by usual casting. Although it is not necessary to particularly provide a heat shielding layer, diffusion coating of Cr or Al is performed on the second stage nozzle to raise the corrosion resistance. Each of the nozzles has internal cooling holes, and is cooled with compressed air. A useful temperature of these alloys at $10^5$ hours 6 kgf/mm$^2$ is 840–600° C. In this casting material also, a similar heat treatment is effected. The second and third stage nozzles are arranged so that each center is positioned at about a central position between respective blades.

In this embodiment, the turbine disc is made of a Ni-base forging alloy which comprises, by weight, 0.03–0.1% C, 12–18% Cr, 1.2–2.2% Ti, 30–40% Fe, 2.5–3.5% Nb, 0.002–0.01% B and the remaining substantially Ni. This Ni-base forging alloy has a 450° C. $10^5$ hours creep rupture strength of 50 kgf/mm$^2$ or more, and sufficiently satisfies the strength necessary for high temperature gas turbine material.

The compressor blades are arranged in 17 stages, and an air compression ratio obtained thereby is 18.

Fuel used therefor is natural gas, light oil.

With the above-mentioned construction, a gas turbine can be obtained which is totally higher in reliability and well-balanced, and a power generation gas turbine can be achieved in which an inlet temperature of gas into the first stage nozzle is 1,500° C., a metal temperature of the first stage turbine blade is 920° C., an exhaust gas temperature of the gas turbine is 650° C., and a power generation efficiency by LHV expression is 37% or more.

Figure 6:
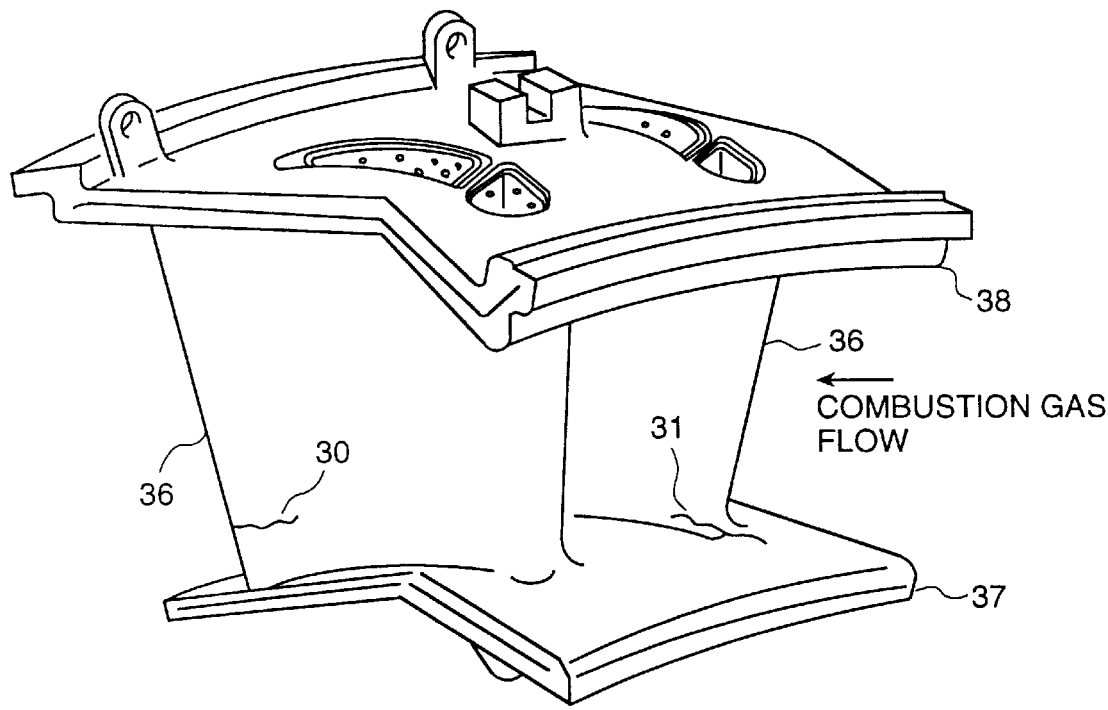
FIG. 6 is a perspective view of a first stage nozzle of a gas turbine according to the present invention.
Figure 7:
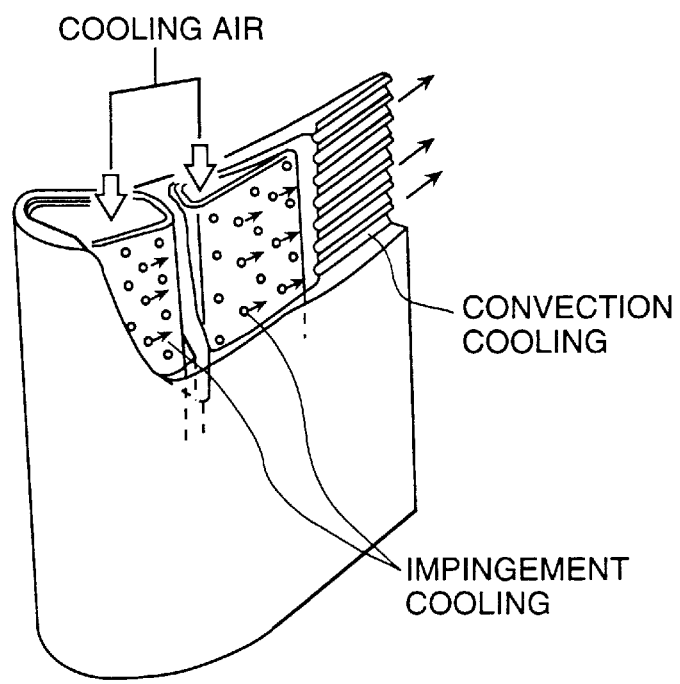
FIG. 7 is a perspective view of a vane portion of the first stage nozzle in FIG. 6.

FIG. 6 is a perspective view of the first stage nozzle of the present embodiment. As shown in FIG. 6, two series of vanes 36 are integrated with an outer side wall 38 and an inner side wall 37 to be one block. Each vane 36 is formed into a crescent shape having a round end, and the interior is made of a hollow thin material into which cooling air flows. The vane portion has a lot of cooling holes at an upstream leading edge portion so that the cooling air from both side wall sides flows into the vane portion and goes into the outside at a downstream side, and the vane portion is cooled in an impingement cooling method, as shown in FIG. 7. Further, at the trailing edge portion, a lot of cooling holes are provided so that the cooling air communicates with the outside at an end portion and a tip end face of the vane portion. The trailing edge potion is cooled in a convection cooling method.

Figure 8:
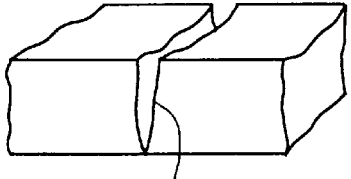
FIG. 8 is perspective views showing cracks of a first stage nozzle and groove shapes for welding.
Figure 8:
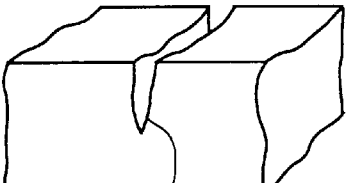
Figure 8:
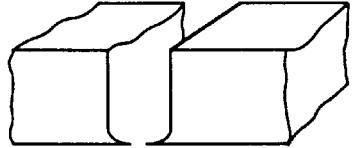
Figure 8:
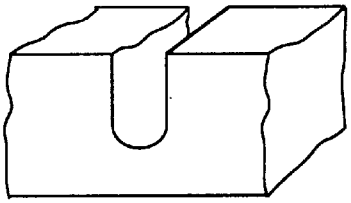
Figure 8:
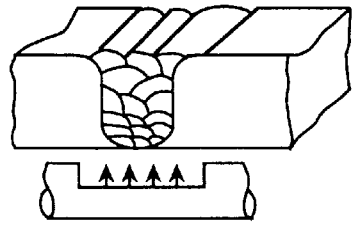
Figure 8:
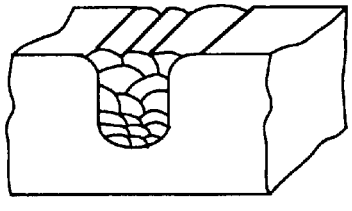

The gas turbine nozzle is exposed to high temperature combustion gas of 1,500° C. at the first stage during operation for a long time, as mentioned above, as shown in FIG. 6, and further receives strong constrictive force due to its construction, so that cracks 30, 31 occur during working. Those cracks 30, 31 are generally of type A: through crack (vane trailing edge side) or type B: non-through crack (vane root portion), represented by FIG. 8. Those cracks are completely cut away from end to end by cutting about 10 mm in width with a superhard cutter, and a multi-layer weld is formed on each of the cut away portions by overlaying three passes or more in a width direction by TIG welding. The multi-layer weld is formed to be higher than the nozzle surface by one layer. Further, upon welding, the gas turbine nozzle was subjected to solution treatment of heating to keeping at 1,150° C. for 4 hours. The heating was effected in a non-oxidized atmosphere.

Further, in a first layer welding of the through crack, back shield was performed with argon gas in order to form sufficient penetration beads. After welding for repairing, a dyeing flaw detection test was conducted, and as a result, defects such as cracks could not be found in the welded portion, and it was confirmed that there was no problem in weldability in welding of a real machine, too. After welding, solution treatment of heating keeping 1,150° C. for 4 hours in non-oxidized atmosphere was performed again. Then an ageing treatment at 982° C. was conducted, and then the multi-layer weld was machined and ground so that the weld surface because the same in height as the base body surface of a base alloy. Successively, heat shield coating of a $ZrO_2$ layer was formed inside the vanes and side walls. Next, the nozzles repaired by welding were mounted on a real machine, and its reliability was studied. Cracks and damages due to corrosion were not found in the repair-welded portions.

Further, a turbine exhaust gas temperature was 550–650° C., and in a case where the gas turbine was combined with a high, intermediate and low pressure sides integrated steam turbine of steam temperature of 530° C. or more and final stage blade portion length of 30–50 inches to form a composite power generation system, a high total power generation efficiency was attained.

According to the present invention, by employing optimum material of blades and nozzles in a gas turbine with an turbine inlet temperature of 1,500° C. class, by using again repaired parts having been operated for a long time, an operation is possible under the same condition as before, and a gas turbine of a high efficiency of 37% or more by LHV expression can be obtained.

What is claimed is:

1. A nozzle for a gas turbine, formed by vanes and side walls provided at both ends of said vanes, and made of a Co-base casting alloy comprising, by weight, 0.20–0.30% C, not more than 1.0% Si, not more than 1.0% Mn, 20–32% Cr, 9–12% Ni, 5–10% W, not more than 5% Fe and 0.0005–0.015% B, wherein said nozzle has at least a crack repaired with a multi-layer weld formed by welding, said multi-layer weld being made of a Co-base alloy comprising, by weight, 0.03–0.10% C, not more than 1.0% Si, not more than 1.0% Mn, 20–30% Cr, 15–23% Ni, 3–10% W, 5–15% Ta and 0.05–0.7% Zr.

2. A nozzle for a gas turbine according to claim 1, wherein said multi-layer weld is formed by welding 3 passes or more in a width direction perpendicular to a welding direction, said multi-layer weld having an outer surface ground to the same height as that of a surface of an adjacent portion to the repaired portion.

3. A nozzle for a gas turbine according to claim 1, wherein said multi-layer weld is formed in a length of 10 mm or more.

4. A nozzle for a gas turbine according to claim 1, wherein said nozzle has at least two vanes and said multi-layer weld is made of said Co-based alloy in which Cr and W each are less in weight % than said Co-base casting alloy.

5. A nozzle for a gas turbine according to claim 1, wherein said multi-layer weld is made of said Co-base alloy which has a C content of 0.10–0.40 times as much as the C content of said Co-base casting alloy.

6. A nozzle for a gas turbine according to claim 2, wherein said multi-layer weld is formed in a length of 10 mm or more.

7. A nozzle for a gas turbine according to claim 1, wherein said crack is repaired with a multi-layer weld formed by welding 3 passes or more in the width direction perpendicular to a welding direction and said multi-layer weld having an outer surface ground to the same height as that of a surface of an adjacent portion to the repaired portion.

8. A nozzle for a gas turbine according to claim 1, wherein said nozzle is formed with at least two vanes and said nozzle has at least a crack repaired with a multi-layer weld formed by welding, said multi-layer weld being made of a Co-base alloy which has C of content of 0.10–0.40 times as much as the C content of said Co-base casting alloy.

9. A nozzle for a gas turbine according to claim 1, wherein said multi-layer weld is made of said Co-base alloy which has a C content of 0.10–0.40 times as much as the C content of said Co-base casting alloy and in which Cr and W each are less in weight % than said Co-base casting alloy.

10. A nozzle for a gas turbine according to claim 1, wherein said multi-layer weld is formed by welding 3 passes or more in the welding width direction perpendicular to a welding direction, said multi-layer weld having an outer surface ground to the same height as that of a surface of an adjacent portion to the repaired portion and said multi-layer weld is formed in a length of 10 mm or more.

11. A gas turbine for power generation, provided with said gas turbine nozzles according to claim 1.

12. A welding material made of a Co-base alloy comprising, by weight, 0.03–0.10% C, not more than 1.0% Si, not more than 1.0% Mn, 20–30% Cr, 15–23% Ni, 3–10% W, 5–15% Ta and 0.05–0.7% Zr.

13. A Co-base alloy according to claim 12, further comprising, by weight, at least one element selected from not more than 1% Al and not more than 2% Fe.

14. A welding material according to claim 12, wherein said Co-based alloy further comprises, by weight, at least one element selected from 0.05–1.0% Ti, 0.05–0.5% Nb and 0.05–0.5% Hf.

15. A welding material according to claim 12, wherein said Co-based alloy further comprises, by weight, 0.005–0.02% B.

16. A welding material according to claim 12, wherein said welding material is constructed in the form of a wire, rod or a compound wire from metal powder which is filled into a steel tube of small diameter.

17. A gas turbine for power generation comprising an air compressor, a combustor, turbine blades fixed to a turbine disc and turbine nozzles provided corresponding to said turbine blades, wherein an inlet temperature of combustion gas to a first stage of said turbine nozzle is 1,250–1,600° C., and said gas turbine nozzles each are as defined in claim 1.

18. A welding material made of a Co-base alloy comprising, by weight, 0.03–0.10% C, not more than 1.0% Si, not more than 1.0% Mn, 20–30% Cr, 15–23% Ni, 4–7% W, 5–15% Ta and 0.05–0.7% Zr.

* * * * *